United States Patent [19]
Borrello

[11] 3,797,982
[45] Mar. 19, 1974

[54] EXTRUDER OUTPUT MULTIPLIER
[75] Inventor: Giuseppe Borrello, Anzio, Italy
[73] Assignee: Colgate-Palmolive Company, New York, N.Y.
[22] Filed: May 8, 1972
[21] Appl. No.: 251,146

[30] Foreign Application Priority Data
May 26, 1971 Italy .................................. 50589/71

[52] U.S. Cl. ................................. 425/198, 425/461
[51] Int. Cl. ............................................... B29f 3/00
[58] Field of Search ............ 425/198, 382, 461, 464

[56] References Cited
UNITED STATES PATENTS
2,370,765  3/1945  Atwood .............................. 425/464
2,775,788  1/1957  Andrew .......................... 425/382 X FOREIGN PATENTS OR APPLICATIONS
992,179   7/1951  France ............................... 425/464

Primary Examiner—R. Spencer Annear
Attorney, Agent, or Firm—Herbert S. Sylvester, Esq.; Murray M. Grill, Esq.; Kenneth A. Koch, Esq.

[57] ABSTRACT

A cylindrical extrusion head having a series of varied size, multiple outlet orifices is used to multiply the output of an extruder.

6 Claims, 4 Drawing Figures

PATENTED MAR 19 1974　　　　　　　　　　　3,797,982

EXTRUDER OUTPUT MULTIPLIER

In the past various types of extrusion heads have been developed for use in conjunction with conventional soap plodders which have the function of producing a material in thin strands, known in the trade as "spaghetti." It has been discovered that while extruding a plastic mass of detergent, the total free opening of extrusion plays an important role in controlling the rate of output, all other factors being constant. If a conventional extruder is equipped with a round perforated plate and a wire net is placed behind it so as to provide for the extrusion of the thin strand material, it has been determined that the plastic mass of detergent is more easily worked when the total exit-free area is at a maximum value compatible with the strength necessary for the plate. In view of the foregoing, the present invention overcomes the disadvantages of the prior art extruder heads by providing a special extrusion head which makes the free area independent of the diameter of the extrusion head within wide limits and as a result a greatly multiplied output for the extruder is achieved while the power absorption at the extrusion head is actually reduced.

It is therefore, the primary object of the present invention to provide a special extrusion head adapted to facilitate a markedly increased output for a conventional soap extruder or plodder without increasing the power consumption thereof.

A further object of the invention is to provide for less power consumption on an equal extruded product basis while providing for smoother operation because the extruded product finds its natural way through which it flows.

A further object of the present invention resides in the provision of an extruder output multiplier which has provision to allow injection of compressed air in order to obtain aeration of the thin strands and a lighter product.

Yet another object of the invention resides in the provision of an extruder output multiplier which is adaptable to be used in conjunction with conventional soap and detergent laundry bar extruders including twin screw-type plodders and which would be less likely to become damaged during use because the progressive bending normally observed on conventional plates is due to the lack of sufficient exit area, while achieving a better product because the heat induced by the strong resistance because of insufficient surface area in conventional plates is eliminated.

Still further objects and features of this invention reside in the provision of an extruder output multiplier that is simple in construction, capable of being installed on various types of existing equipment, and which may be made of any suitable readily available materials, such as cast iron, stainless steel, copper alloys, aluminum and alloys thereof, or plastic material which may be reinforced as desired and of any suitable desired thickness.

These objects and features of the present invention are illustrated in the accompanying drawings, by example only, wherein.

Figure 1:
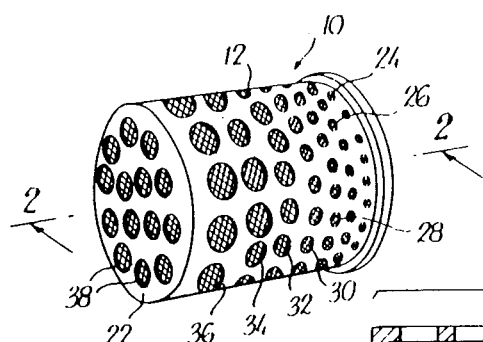
FIG. 1 is a perspective view of an extruder output multiplier constructed in accordance with the concepts of the present invention.
Figure 2:
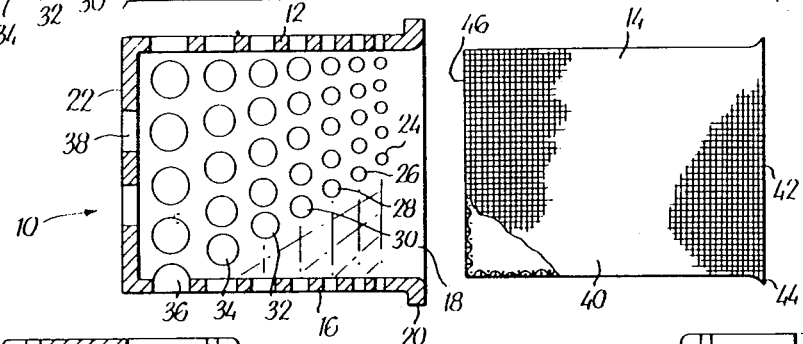
FIG. 2 is an exploded longitudinal sectional view taken along the plane of line 2—2 in FIG. 1.

With continuing reference to the accompanying drawings, wherein like reference numerals designate similar parts throughout the various views, reference numeral 10 generally designates an extruder output multiplier constructed in accordance with the concepts of the present invention. The extruder output multiplier includes two main portions including a cylindrical body 12 and a screen 14. The body 12 includes cylindrical side walls 16 having an open end 18. The side walls 16 are provided with a flange 20 at the open end 18 and extending radially outwardly of the cylindrical body 12. The body 12 is further provided with a closed end wall 22. As illustrated in the drawing, any suitable number or rows of apertures may be provided, there being seven rows of series of apertures 24, 26, 28, 30, 32, 34 and 36. It is particularly to be noted that the apertures increase in size depending on the distance that the apertures are from the open end 18. The end wall 22 is also provided with suitable apertures 38 therein.

The screen 14 is provided with a cylindrical side wall 40 and has an open end 42 provided with a flared mouth as at 44 and has a closed end wall 46. The screen is preferably formed of a wire mesh or net, preferably formed of stainless steel.

The body 12 can be easily secured to a conventional soap-type extruder or plodder by means of a flange 50 which is held by bolts 52 directly to the screw-type extruder 54. A secondary screw rotating with the main extruder screw fills the cylindrical device.

In carrying out the invention, it has been determined that the size of the apertures of each of the rows thereof cannot be as large as might be otherwise desired because in order to provide the thin strand or "spaghetti-type" extruded material, the wire mesh or net of the screen 14 must be of certain strength and resistance. The wire mesh can be in the range of 0.3 to 1 mm or so free opening and of 0.15 to 1.5 mm thickness of the wire. Hence, according to the wire mesh or net chosen for each case, there is a limit for the maximum size for the apertures or otherwise the screen may be subjected to being distorted or broken.

The series or perforations 24, 26, 28, 30, 32, 34, and 36 have a rationalized distribution consisting of the apertures increasing in size as they approach the end wall 22. This is because if the perforations are all equal in size, there is a tendency of the extruded product to "end channel" at the first two or three series or rows of perforations, while the remaining apertures will be working at lower speed or not working at all. In instances where the length of the body 22 is from 0.5 to 2 times the diameter of the body 12, then it has been found that a preferred mathematical law correlating the aperture size y to the increasing distance to the filter pass x is a parabolic one according to the formula $y = ax^2 + bx + c$ where the parameters are $a = -0.12$ $b = +2.456$ $c = +4.0$.

As the holes increase properly in size, the result is a complete exit from all perforations because the resistance to friction is adequately dosed along the cylinder.

While the coefficients for the perimeters as shown in the Example of FIG. 1 have been specifically given, the following coefficients are within the range of those considered:

|   | General Ranges | Preferred Ranges |
|---|---|---|
| a | −0.5 to +0.5 | −0.05 to −0.10 |
| b | +0.5 to +5 | +1 to +3 |
| c | +2 to +50 | +4 to +20 |

The aperture size $y$ is in millimeters and the hole distance $x$ is in centimeters and the formula is that of a parabola.

The $c$ value is a diameter of the holes in millimeters of the first group of holes corresponding to the holes 24 observing that when "$a$" is zero, the equation becomes a straight line and then $y = bx + c$ whereas "$b$" is the slope of the line. The following example corresponds to the illustrated embodiment of FIG. 1:

EXAMPLE I :

A stainless steel holed cylinder to be adapted to an extruding pilot unit was built, with the following characteristics:

| | |
|---|---|
| thickness | 5mm |
| external diameter | 90mm |
| length | 105mm |

Seven series of cylinder perforations were made on the cylinder surface, parallel to one another, growing in size from the cylinder base.

| Row of Apertures Reference Numeral | No. of Perforation | Diameter of Perforations mm | Distance from center of first hole series mm |
|---|---|---|---|
| 24 | 29 | 4 | 0 |
| 26 II | 25 | 6 | 8 |
| 28 III | 22 | 8 | 17 |
| 30 IV | 19 | 10 | 28 |
| 32 V | 17 | 12 | 41 |
| 34 VI | 15 | 14 | 56 |
| 36 VII | 13 | 16 | 73 |
| 38 | 14 | 14 | — |

In the inner cylinder wall, and on the bottom, a U.S. wire net of about (0.5mm free opening) was placed and the piece was mounted on the adaptation flange.

A small screw, rotating with the main screw of the extruder, was placed inside the cylinder.

As a result 110 kilos per hour were obtained instead of the normally obtained 35 kilos per hour.

In comparing the results obtained by the invention, with that of a conventional round plate, the following is a table of results:

| | Total perforated surface sq. mm | Effective exit surface sq. mm. | Power absorption | Output Kg/h |
|---|---|---|---|---|
| Conventional plate | 2.154 | 718 | 3.5–4 | 35 |
| Example I | 12.868 | 4.289 | 2–3.5 | 110 |

A further example of an extruder output multiplier in accordance with the invention is as follows:

EXAMPLE II :

A stainless steel holed cylinder to be adapted to an extruding full scale unit was built with the following characteristics:

| | |
|---|---|
| thickness of cylinder | 5mm |
| external diameter | 272mm |
| length | 118mm |

Five series of cylindrical perforations were made on the cylinder surface, parallel to one another, growing in size from the cylinder base. The bottom plate thickness was 18mm and had 97 conical holes larger on the outside (23mm diameter) and smaller inside (18mm diameter).

| Series of Apertures | No. of Perforations | Diameter of Perforations mm | Distance from center of first hole series mm |
|---|---|---|---|
| I | 51 | 10 | 0 |
| II | 45 | 12 | 15 |
| III | 40 | 14 | 35 |
| IV | 36 | 16 | 55 |
| V | 34 | 18 | 75 |
| Bottom plate | 97 | conical 23–18 mm | |

The result was 400 kilos per hour instead of the normal output of 260 kilos per hour, notwithstanding that only half of the cylinder worked for cold air blown continuously on the cylinder.

For extruder output multipliers in accordance with the invention where relatively long cylinders are used for very powerful extruders and wherein holes preferably not over 50mm because otherwise wire mesh may be damaged; a formula for the size of the holes is: $y = b/c-x - a$ The empirical coefficients may have the value as follows:

|   | from | to |
|---|---|---|
| a | −43 | +190 |
| b | +90 | $+40.10^3$ |
| c | −20 | +200 |

Further, in lieu of the flat end wall 22, an end wall in the form of a cone or hemispherical dome may be employed.

Figures 3, 4:
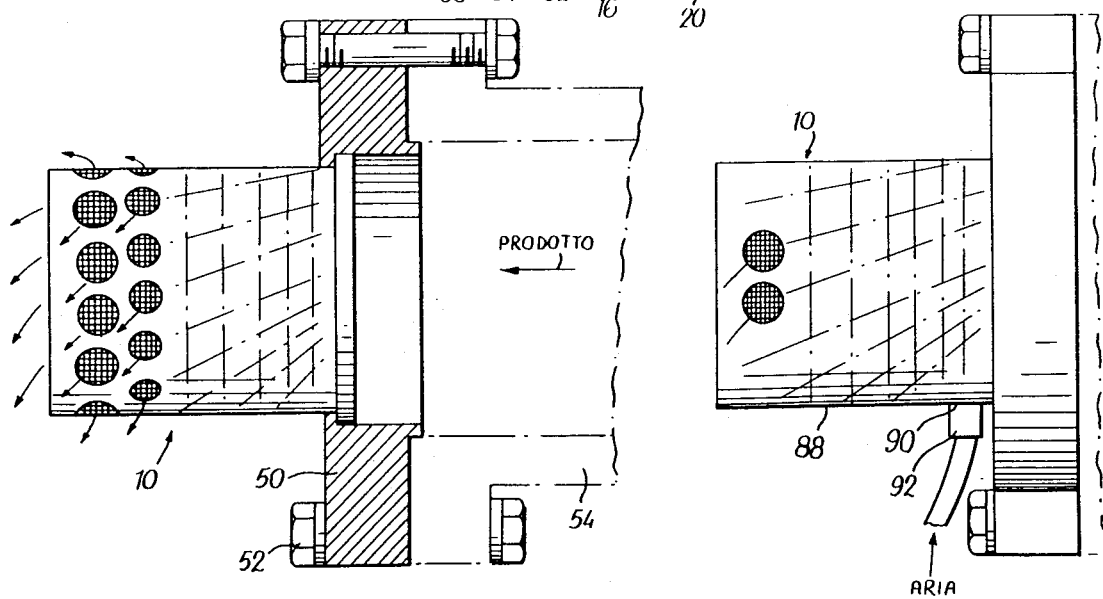
FIG. 3 is an elevational view of the extruder out-put multiplier as shown installed on a conventional plodder; and, FIG. 4 is a view similar to FIG. 3, but showing the manner in which an air sparger may be connected to the invention.

As shown in FIG. 4, an extruder output multiplier head may have the body 88 thereof provided with a vent 90 to which a conduit 92 forming an air sparger is supplying compressed air may be attached. This supply of compressed air or air sparger may be provided for aerating the device so as to provide for a lighter weight product.

Various heating systems or cooling systems can be provided for the extruder output multiplier to assure for optimum condition of the product being extruded. These may employ hot water, steam, electrical coils, micro-wave heating, electrical induction heating or other conventional means. Further, the body 12, if desired, may be provided with suitable baffles or a suitable insert of hemispherical or conical shape can be provided. Further, the body 12 can be made in two pieces and suitably secured together.

A latitude of modification, change and substitution is intended in the foregoing disclosure, and in some instances some features of the invention will be employed without a corresponding use of other features.

I claim:

1. An extruder output multiplier characterized by a cylindrical body having an open end and a perforated closed end opposite said open end, means on said body adjacent said body having a plurality of series of annularly spaced apertures therethrough, and a cylindrical screen disposed in said body, said screen having an open end and a closed end adjacent said closed end of said body, each of said series of apertures being of increasing dimensions as the distance thereof from said open end increases.

2. An extruder output multiplier characterized by a cylindrical body having an open end and a perforated closed end opposite said open end, means on said body adjacent said open end for attachment of said body to an extruder, said body having a plurality of series of annularly spaced apertures therethrough, a cylindrical screen disposed in said body, said screen having an open end and a closed end adjacent said closed end of said body, said body having a vent therein adjacent said open end, and means for supplying air into said body communicating with said vent.

3. An extruder output multiplier according to claim 1, wherein the length of said body is not less than one half the diameter of said body nor more than twice the diameter of said body.

4. An extruder output multiplier according to claim 2. wherein each series of apertures are of increasing dimensions as the distance thereof from said open end increases.

5. An extruder output multiplier according to claim 1, wherein said screen is of wire mesh.

6. An extruder output multiplier according to claim 2, wherein said screen is a perforated metallic sheet with small circular openings from 0.2 to 2 mm in diameter, instead of a wire net screen. The thickness of the perforated sheet ranges from 0.2 to 2 mm.

* * * * *